May 1, 1951　　　　　G. M. ROGERS　　　　　2,551,053
FUEL PUMP
Filed Dec. 6, 1946　　　　　　　　　　　　　5 Sheets-Sheet 2

INVENTOR
GARDINER M. ROGERS
BY
ATTORNEY

May 1, 1951   G. M. ROGERS   2,551,053
FUEL PUMP
Filed Dec. 6, 1946   5 Sheets-Sheet 3
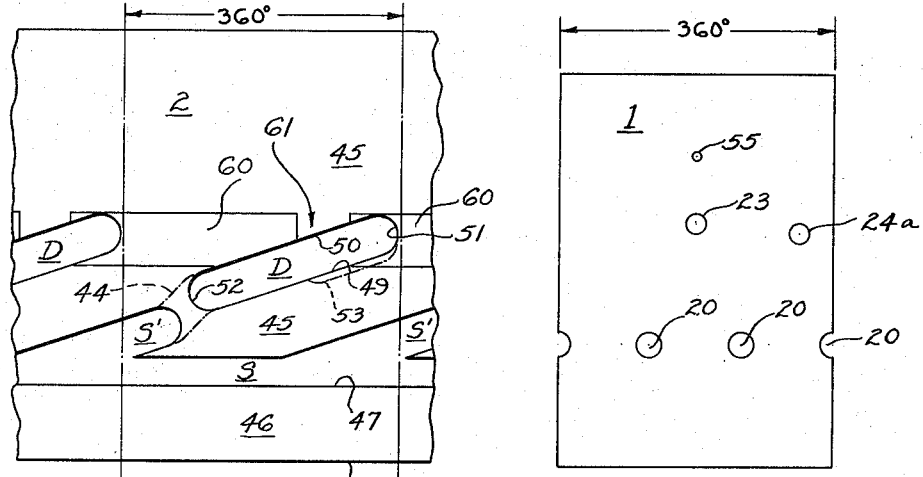
FIG. 5                   FIG. 6
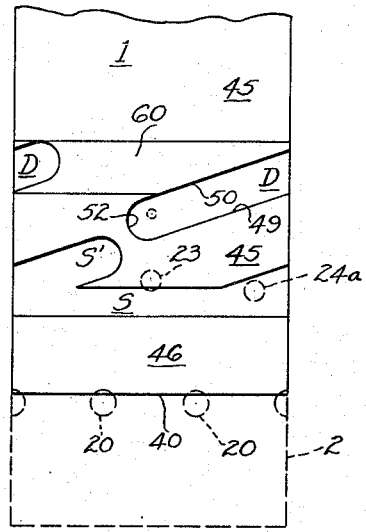   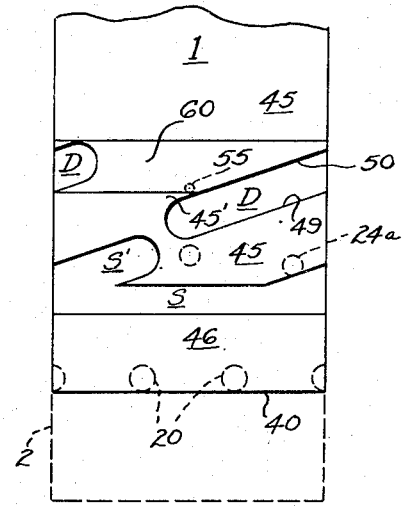
FIG. 7                   FIG. 8
INVENTOR
GARDINER M. ROGERS
BY
George M Soule
ATTORNEY May 1, 1951  G. M. ROGERS  2,551,053
FUEL PUMP Filed Dec. 6, 1946  5 Sheets-Sheet 4

INVENTOR
GARDINER M. ROGERS
BY
*George M Soule*
ATTORNEY

May 1, 1951  G. M. ROGERS  2,551,053
FUEL PUMP
Filed Dec. 6, 1946  5 Sheets-Sheet 5

INVENTOR
GARDINER M. ROGERS
BY
*George M South*
ATTORNEY

Patented May 1, 1951

2,551,053

UNITED STATES PATENT OFFICE 2,551,053

FUEL PUMP

Gardiner M. Rogers, Ithaca, N. Y.

Application December 6, 1946, Serial No. 714,553

14 Claims. (Cl. 103—41)

The invention relates to an improvement in fuel injectors for internal combustion engines especially of the Diesel type, and more particularly to a unit injector fuel pump and fuel atomizing nozzle mechanism. The above indicates the general object hereof.

The invention as illustrated herewith is embodied in a fuel injector pump of the class having a plunger reciprocable in a cylinder and having valving lands formed to define an effective-stroke adjustment helix cavity or edge operatable for fuel quantity adjustment as by a fuel rack connected with the plunger, which helix, in cooperation with lateral ports in the cylinder, is positionable to vary the amount of fuel introduced to the engine during uniform length strokes of the plunger. In the usual fuel injector pump of that class, commonly known as a jerk pump, a substantially fixed volume of fuel is delivered to the associated engine cylinder or combustion space for each rack setting irrespective of engine speed. When a unit injector jerk pump is used with a fixed injector nozzle orifice (or with fixed nozzle orifices) variation in the fuel injection pressure is controlled principally by engine operating speed. After the usual delivery valve is opened, the injection pressure (neglecting leakage) is controlled solely by engine operating speed. Since injection cannot take place until the delivery valve is opened, it is factual to say that with the usual jerk pump (neglecting the factor of leakage), injection pressure rises as a function of increase in engine speed. Since spray pattern and atomization (again assuming fixed nozzle orifices) are controlled by the pressure in the nozzle, both are inflexibly tied to engine speed in the usual jerk pump.

A different type of injector pump falling in the same general class is made the subject matter of my application Serial No. 608,588, filed August 2, 1945. In that injector pump a controlled or regulated pressure is built up in the pressure chamber of the pump before the pressure chamber is communicated with the atomizing nozzle, and substantially that pressure is maintained thereafter during the working stroke of the pump. Injection starts, during maintenance of controlled pressure, upon opening of the delivery port and whatever check valve may be used between said port and the nozzle. The volume of fuel normally delivered to the nozzle per plunger stroke of a given length is essentially a combined function of the capacity of the injector nozzle orifices to convey fuel to the combustion chamber and of the pressure control or regulating means in venting or by-passing part of the displacement capacity of the pump. The present invention as illustrated is embodied with an injector pump of such controlled injection pressure type; and another object is to provide an improved injector mechanism of that type.

In my said application, the injection pressure control is shown in the form of a small fuel by-pass port or vent for the pressure chamber communicating therewith through the bushing or cylinder of the pump and a spring closed valve in the form of a metal ring bearing at one side against a plug for the pressure control port, said plug being in the form of a smooth steel ball. Calibrated tension of the spring limits the pressure which can be built up in the pressure chamber thus modifying the inherent tendency for the pressure to rise with increased engine operating speed. In the system, according to my said application, the apparatus was found inadequate to perform efficiently over as great a speed range as required for some types of operation.

One difficulty experienced with the controlled pressure injector pump as outlined above arose from the fact that in order to maintain the volume of injected fuel required to maintain high speed under load it was found necessary to decrease the part of each pump charge of fuel spilled through the pressure control port at high speeds, thus gaining the desired volume at those speeds. The pressure control port in the cylinder wall could not be decreased in diameter indefinitely for the purpose of restricting the volume so spilled, partly because of manufacturing limitations and partly because that port, in serving as a restricted vent for surplus fuel in building up injection pressure prior to the beginning of delivery to the nozzle, would, if made extremely small, create excessively high pressures in the pump operating mechanism and excessive strain on the pump plunger and cylinder and their operating means after the supply port of the pump is closed and before the delivery port is opened.

Since the volume of injected fuel at a given fuel setting falls off too rapidly for as high a power attainment at high speed as sometimes desired, the present invention was developed primarily to enable the practical attainment of higher controlled pressure in the pump and, concomitantly, to cause greater proportional shares of the pump fuel displacement per stroke to be delivered efficiently to the combustion space of the engine at high speed without sacrifice of satisfactory engine performance at lower speeds.

The embodiment of the present invention illustrated herewith comprises primarily the provision of a pressure control relief clearance between the pump plunger and its effective bore surface, which clearance will operate to control efficiently the pressure in the pressure chamber prior to injection and during injection at the various operating speeds (and loads) required, for example, in the use of Diesel type engines to drive vehicles.

The specific speed control mechanism shown, comprises a relief area of a few ten thousandths of an inch deep, radially of the plunger, preferably formed by removing a small amount of the plunger land surface adjacent to and intersecting a control edge of the plunger so that the relief gap acts in series with the pressure control port and with different operative effects as speed is increased with a given rack setting to the end that the fuel delivered to the injector nozzle and that vented by the control means is proportionately different at different engine speeds. The radially shallow relief gap of considerable breadth will hereinafter usually be referred to as a control band, indicating an annulus or fragment thereof which may extend wholly or partially in any desired direction relative to the axis of the plunger.

The pressure control relief area may be positioned to communicate with the pressure control port for the entire high to low fuel setting or any portion of the range of fuel settings. The relief area may intersect any cavity or fuel port closing or spill edge portion of the plunger which communicates with the pump pressure chamber; and the relief port may sometimes serve other functions, e. g. ordinary spill. Also the radial depth of the relief area may vary at different regions circumferentially of the plunger and/or axially of the plunger.

Other objects and features of the invention will become apparent from the following description of the exemplary embodiments shown by the accompanying drawing, wherein:

Fig. 4 is a transverse sectional view through the injector plunger and cylinder as indicated by the line 4—4 on Fig. 1;

Figs. 5 and 6 are diagrammatic representations of developments of the plunger and cylinder surfaces and typical arrangements of cooperating recesses and ports intersecting respective surfaces.

Figure 9:
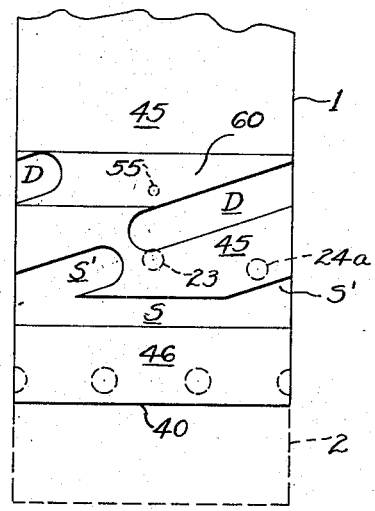
Figure 10:
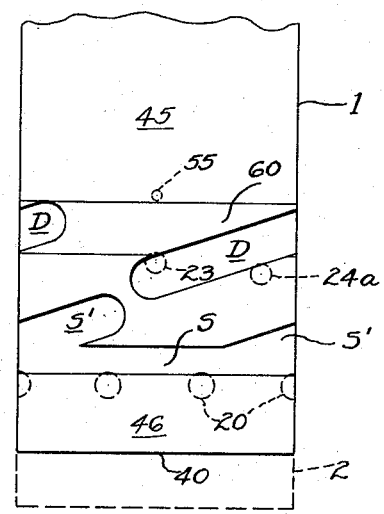
Figure 11:
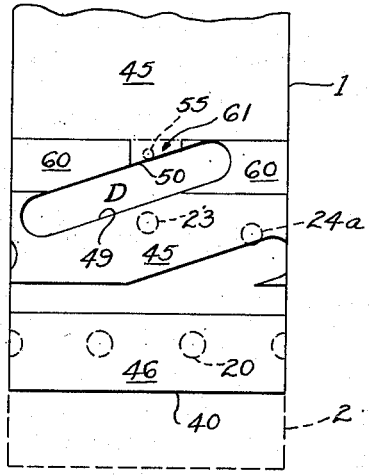
Figure 12:
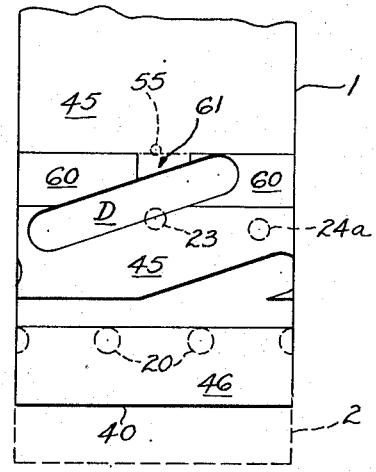
Figure 13:
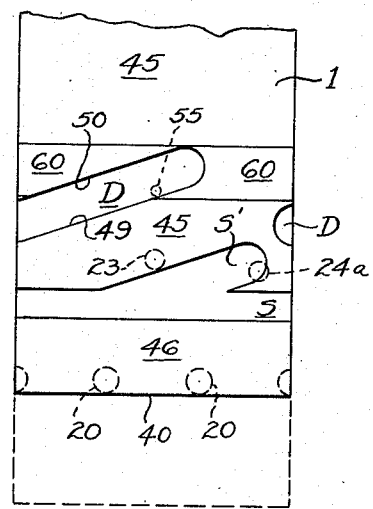
Figure 14:
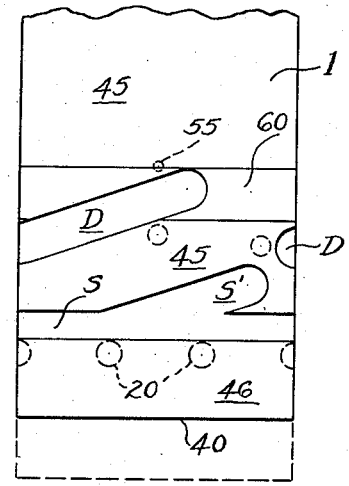
Figure 15:
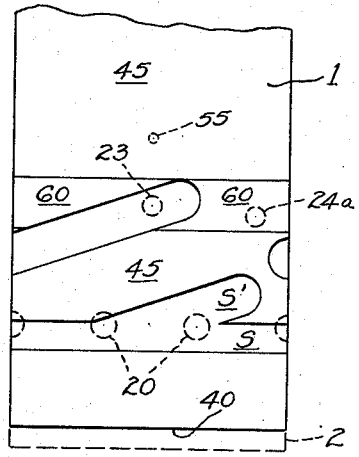
Figure 16:
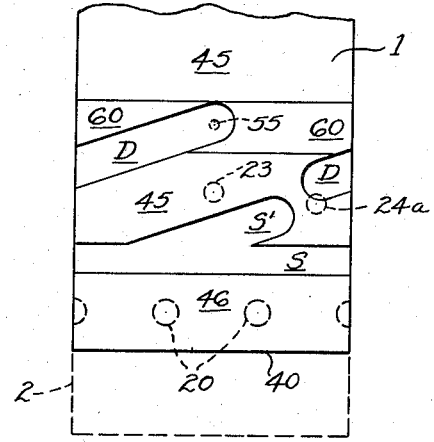

Figs. 7 to 10 inclusive, are superimposed development diagrams of the plunger and cylinder, showing different axial relationships between the plunger and cylinder surfaces (ports, cavities, etc.) with the plunger adjusted for full or maximum fuel delivery;

Figs. 11 and 12 are views similar to Figs. 7 to 10, showing the plunger adjusted to a low idling speed position;

Figs. 13 to 15 inclusive, are views similar to the foregoing (e. g. 11 and 12) showing the plunger adjusted to an initial no fuel position;

Fig. 16 is a similar view showing the maximum no fuel position adjustment of the plunger.

Figure 1:
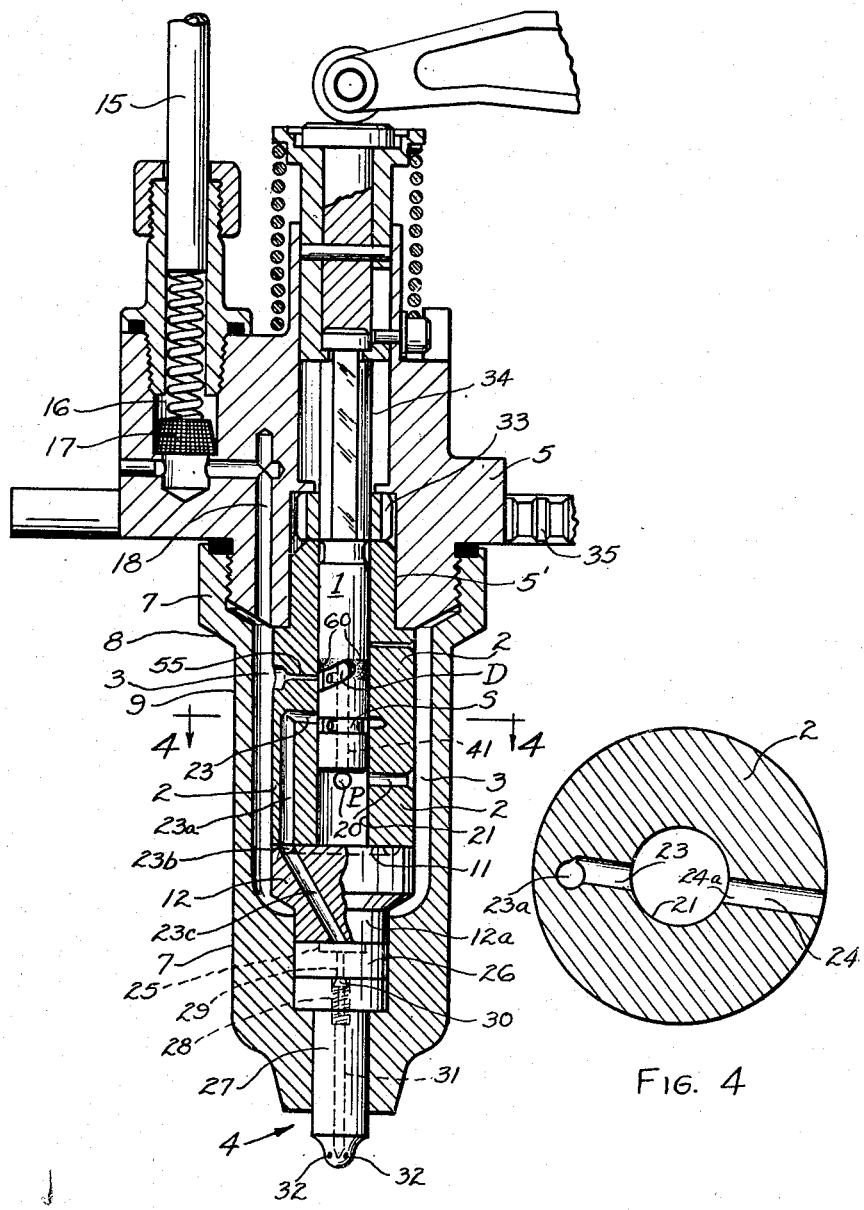
Fig. 1 is a longitudinal central assembly view of a unit injector incorporating the present invention in one form.

Referring to Fig. 1 showing a unit type of injector pump mechanism, an engine-operated plunger piston 1 slidably fitting a pump cylinder 2, usually referred to in the art as a bushing, is reciprocated in a manner to receive fuel into a pressure chamber P of the cylinder from a fuel cavity or reservoir 3 through suitable supply port means during successive pump filling or suction strokes of the plunger and to deliver charges of fuel to a combustion space of the engine through an atomizing nozzle assembly generally shown at 4 during uniform length pressure strokes of the plunger. The unit injector as shown herein includes a main body member 5 receiving, in a counterbore 5' thereof, a reduced diameter upper portion of the pump cylinder or bushing 2. The body 5 is threaded as at 6 for engagement with a sleeve-like nut 7 which enters the associated engine cylinder (not shown), as through the cylinder head water jacket, and supports the nozzle assembly 4 in communication with the combustion space of the cylinder. The sleeve-like nut 7 has a shoulder at 8 for engagement with a suitable gasket (not shown) around an opening in the cylinder head, and an adjacent reduced diameter portion 9 which fits a smaller bore in the cylinder head and is held therein by suitable means (not shown) which engages the body 5 and forces the shoulder 8 against the cylinder head.

The fuel cavity or reservoir 3 is formed as an annular space between the bushing 2 and sleeve-like nut 7, said space being generally sealed at its top end. The lower end face 11 of the bushing 2 abuts a coaxial base piece or cylinder head in the form of a recessed block 12. The base piece is one of a plurality of stacked centrally apertured injector nozzle assembly parts fixedly supported in and by the sleeve nut in more or less conventional arrangement.

The fuel cavity 3 is supplied with liquid fuel under the usual low pressure through a supply pipe 15 leading to a filter chamber 16 containing a filter unit 17. The outlet of the filter communicates with a supply duct 18 in the body 5 entering the upper end of the fuel cavity 3.

Figure 2:
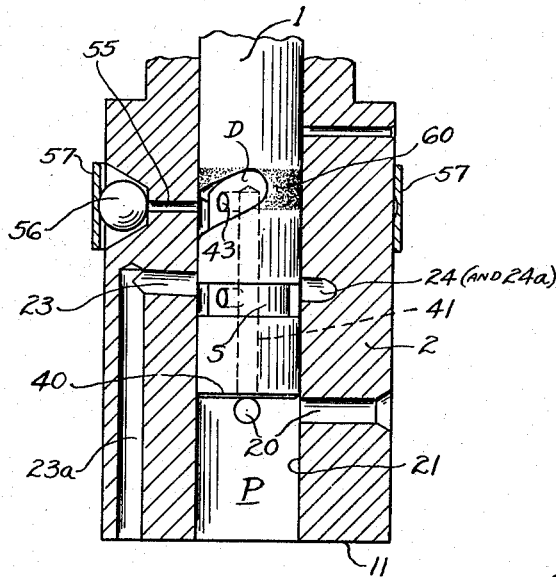
Fig. 2 is a similar fragmentary view on a larger scale showing the present invention used in series with the pressure control valve substantially according to my said prior application.

The cylinder block 2 has a central cylinder bore 21, and, preferably, the pump cylinder has a plurality of radial supply and spill ports 20 leading from the fuel supply cavity 3 to the pressure chamber portion P defined by the cylinder bore 21 and the lower end portion of the plunger 1. The ports 20 lie just below the lower end of the plunger when the latter is in its raised position as shown in Figs. 1 and 2. The lower end of the cylinder 21 is closed by a central planar surface portion of the base block or cylinder head 12 complementary to the bushing end surface 11. The radial ports 20 cooperate for supply directly with the chamber P and for spill with said chamber through the intermediary of a spill recess S in the periphery of the plunger.

Above the spill and supply ports 20 is a lateral fuel delivery port 23 which is formed as part of a nearly diametral cross bore 24 in the cylinder drilled thereinto from the side of the cylinder opposite the delivery port. The delivery port 23 intersects a vertical delivery duct portion 23a which, in turn, enters an annular cavity 23b at the top of the cylinder head or base block 12. Communicating with the annular cavity 23b and also formed in the block 12 is an oblique delivery duct portion 23c, the lower end of which opens into a cavity 25 at the top of an annular nozzle assembly section 26 abutted by the lower reduced diameter end 12a of the block 12. The cavity 25 may contain check valve (not shown) for preventing blow-back of products of combustion from the associated engine cylinder into the pump chamber and supply space 3 through the delivery duct at such times as the delivery port is open but not delivering fuel.

The injector nozzle orifices 32 are formed in a tubular fitting 27 having a counterbore recess at 28 communicating with a central bore 29 of the section 26. A counterbore or cavity 28 in the fitting 27 should contain a check valve 30 of suitable form, normally closed by an appropriate spring. Below the valve 30 the valve chamber 28 communicates with a central bore 31 of the fitting 27 from which the injector nozzle orifices 32 extend generally radially and downwardly into communication with the engine cylinder.

The mechanism for adjusting the plunger 1 in causing different amounts of fuel to be injected per stroke of the plunger is intended to be conventional and comprises, as shown, a pinion 33 slidably keyed to a shank portion 34 of the plunger and a toothed rack 35 slidable in the main body member or block 5 of the injector pump under the control of a governor or throttle mechanism connected with the rack by suitable linkage not shown.

Referring further to the plunger 1, a more than 360 degree development of which is shown in Fig. 5 (portions being repeated beyond the 360 degree indicating lines) the lower effective edge 40 of the plunger (defined by the upper margin of a lower chamfer on the plunger) on the downward or pressure stroke of the plunger closes the supply ports 20, thus initially trapping a definite quantity of fuel in the pressure space P of the cylinder. Said space, however, through a central bore 41 (Fig. 3) in the plunger and interconnected lateral bores 42 and 43 communicates at all times with the spill cavity S and the delivery helix cavity D of the plunger. Both said cavities S and D are sufficiently deep radially of the plunger so as not materially to restrict the free flow of fuel to or from the central and cross passages of the plunger for communication with whatever ports are opened during the plunger stroke. The spill cavity S may be an endless non-inclined annular trough intersecting the outer surface of the plunger, but in order better to accommodate spill fluid particularly at the low speed and no-fuel settings of the plunger, partly to balance the cavity portions around the plunger, thus to assist hydraulically in centering of the plunger in its guide bore, and for other purposes hereinafter described, the cavity S is preferably extended as at S' to provide a supplemental or auxiliary spill cavity. The supplemental spill cavity as shown is helical, that is, parallel to the delivery helix cavity D, and, in some cases, it may be formed as a continuation of the delivery helix cavity as indicated in broken lines at 44 on Fig. 5 only. All the cavities S, S' and D can be very simply formed as end mill cuts in cooperation with appropriate tool guides.

Referring further to Fig. 5, the main delivery control helix cavity D is formed in a land portion 45 of the plunger extending, for example, about three-quarters of the circumference of said land and comprising a lower inclined control edge 49 and an upper control edge 50. The land 45 is, for the most part, of the same diameter as the land 46 separating the lower fuel cut off edge 40 from the lower effective edge 47 of the spill cavity S. The delivery helix cavity D is shown in full lines as closed at its ends by the circular milling cuts. The end cavity wall 51 designates the low fuel end of the cavity and 52 the high fuel end thereof. Near the low fuel end of the cavity there may be provided a preliminary injection relief as indicated by the broken line 53 which relief forms a very slight indentation of the land 45 adjoining the edge 49 of the delivery helix cavity at the low fuel portion thereof. While preliminary injection is desirable under certain conditions at light loads, the relief 53 may be extended farther along the cavity D to cover any desired load. The function of the preliminary injection relief is fully described in my said co-pending application and forms no part of the present invention.

The transverse bore 24 in the cylinder or bushing 2 extends non-radially of the axis of the cylinder but intersecting the bore 21 on one side thereof (lower side, as shown in Fig. 4) less than 180 degrees removed from the delivery port 23. Such relative positioning of the ports 23 and 24a enables the rotation of the plunger for fuel adjustment more than 180 degrees. The bore 24 avoids having to drill the delivery port 23 from the opposite side of the bushing and then having to plug the portion of the drilling radially outwardly beyond the point of intersection with the vertical drilling which forms the delivery duct portion 23a. The bore 24 and correspondingly the delivery port 23 slant somewhat downwardly particularly to provide the auxiliary spill and pump filling port 24a, capable at times of opening into the spill cavity extension S' increasing the total spill port area and serving also to supplement the ports 20 in filling the pump pressure spaces (see Fig. 7) on the upward stroke of the plunger.

Additionally the auxiliary spill port 24a, through the supplemental spill cavity S', serves to by-pass, at low pressure, fuel displaced by the plunger after closing of the main spill ports 20 and until pressure buildup starts. Thus the small pressure control port 55 does not have to by-pass high pressure fuel until the pressure buildup period commences. This is desirable from the standpoint of minimizing non-useful work, particularly at increased speeds. That in turn tends to minimize heating of the fuel.

The particular, mutually parallel, arrangement of the supplemental spill helix cavity S' relative to the delivery helix cavity D enables the portion of the plunger stroke devoted to pressure buildup to be identical in all fuel settings. The relationships between the supplemental spill helix cavity S', the cooperating port 24a and the delivery helix cavity D may be varied, as by changing the shape or position of the cavity S' or the location of the port 24a to control the portion of the plunger stroke devoted to pressure buildup for any particular rack setting.

The formation of the delivery port 23 and auxiliary spill port 24a non-radially of the cylinder and somewhat slanting may be inexpensively and accurately accomplished by the use of appropriate jigs. To form the delivery port 23 as a second drilling operation through the preformed auxiliary spill port, a cylindrical jig is placed inside the bushing 2 and located by means of any suitable reference point so that the drill which forms the delivery port 23 will be properly guided to the exact required position and for intersection with the delivery duct portion 23a as indicated in Fig. 4. The bore 24 is always out of registration with the delivery helix cavity D whenever said cavity is desired to communicate with the delivery port 23. As illustrated by Fig. 11, the auxiliary spill port 24a remains active during low fuel settings freely to vent fuel from the pressure chamber P into the supply space 3 around the cylinder for a considerable portion of the pressure stroke after the main supply and spill ports 20 have been closed so that the pressure control port 55 does not have to vent high pressure fuel until necessary for buildup of injection pressure.

The pressure control port 55 and cooperating pressure control relief area 60 in each rack setting or fuel adjustment of the injector provide a peculiar but predeterminable fuel control characteristic, the operative effect of which is to cause each increase in the amount of fuel injected into the engine to be desirably disproportionate to rise in engine speed. Due to this peculiar fuel control characteristic, the present injector causes the fuel pressure at low speeds to be higher in relation to the pressure delivered by the common unit injector jerk pump at the same speed of engine operation and through an equivalent fixed orifice nozzle, assuming both pumps are designed to deliver the same pressure at their peak higher operating speed. Thus, the present injector pump more nearly approaches the necessary injection pressure in order to obtain desired economy than does a jerk pump and over a wide speed range.

Figure 3:
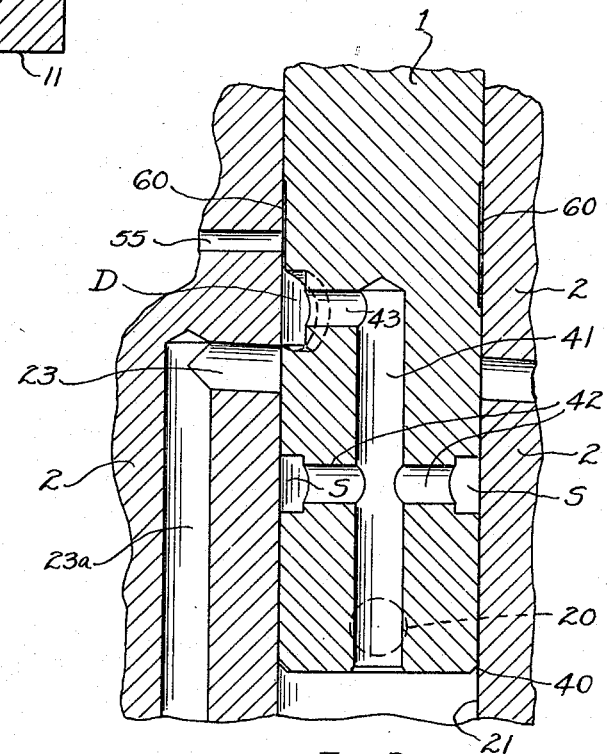
Fig. 3 is a relatively enlarged fragmentary central sectional view of the piston and valving end of the pump plunger according to Fig. 1 and associated portions of the cooperating cylinder.

The clearance gap constituted by the relief area 60 is shown in Fig. 3, for purposes of illustration, of exaggerated radial depth relative to the diameter of the plunger 1 and the diameter of the pressure control port 55.

The illustrated position for the pressure control port 55 is directly above the delivery port 23. Said port 55 communicates the bore 21 of the cylinder with the fuel supply space 3 whenever the delivery helix cavity D is operatively connected or aligned with the inner end of said port 55. There are practical manufacturing limitations to the physical dimensions of the port 55 and the pressure control relief band 60. Thus, there are limitations to said fuel control characteristic obtainable by each pressure control means. Acting in combination (i. e. either in series or in parallel) the fuel control characteristic may be outside of the range of either pressure control means used alone.

As shown in Fig. 2, the outer end of the port 55 may be provided with an additional pressure control means in the form of a valve consisting of a spring pressed spherical plug 56 and annular spring 57 eccentrically surrounding the bushing 2. Such valve comprises the pressure control device disclosed by my application Serial No. 608,588. The valve and relief area 60 of Fig. 2 afford respective fuel control characteristics in the delivery of the injector for a given rack setting. The ring and ball govern the low threshold of injection pressure at low speeds and the restriction due to the relief band 60 governs the injection pressure at high speeds, thus giving controlled pressures at both low and high speed conditions. Since the pressure controls the spray form and atomization, this critical factor can be maintained at its optimum value.

The pressure control relief area 60 for manufacturing reasons preferably extends around the plunger for the entire circumference of the latter, being formed as by a grinding operation only a few ten thousandths of an inch deep. The relief area 60 as usually shown in the drawings hereof, extends along substantially the entire upper edge of the delivery helix cavity D for connection of said cavity with the pressure control port 55 after the supply ports 20 and 24a are cut off by the plunger lands 46 and 45 respectively, and before the delivery helix cavity has opened the delivery port 23. In some instances in order to produce the desired initial injection pressures at low rack settings over the entire speed range, the band may be omitted at the location indicated generally at 61 Figs. 5, 11 and 12; thus enabling the pump to make use of a strain effect in the pressure operating mechanism, etc. resulting from trapped fuel as explained below. Attention is called to my co-pending application Serial No. 686,269, filed July 26, 1946, for an injector of the same type as herein shown, operating throughout all fuel settings to make use of such strain effect.

In the operation of the present apparatus, pressure is built up in the pressure chamber of the pump prior to injection to a value that will insure adequate atomization of the fuel in the combustion chamber at the beginning of injection. This initial pressure buildup is controlled by the relief clearance or control band 60 on the plunger in conjunction with one or more pressure control ports so arranged or positioned as to by-pass fuel from the pressure chamber led thereto through the relief clearance gap.

Referring now to Figs. 7 to 10 inclusive, the operation of the pump for delivery at full fuel adjustment will first be described. Fig. 7 shows the supply ports 20 substantially wholly open as when the plunger 1 is in its fully raised position. Fig. 8 shows the ports 20 closed by the plunger land 46 and shows the pressure control port 55 communicated with the delivery helix cavity D only through the narrow gap afforded by the pressure control relief band 60. The small delta-shaped portion 45' of the land 45 between the cavity D and the control band 60 is not effective in the present construction temporarily to close the pressure control port 55 before communication thereof with the control band gap. However, by raising the lower edge of the control band from the position indicated in the various figures, then, at full fuel setting, exit of fuel from the pressure space P through the pressure control port 55 may be interrupted long enough for a considerable strain to be built up in the pump operating mechanism and compression of the fuel trapped by the pump so that when the delivery helix cavity D comes into registration with the delivery port 23 as illustrated by Fig. 9, fuel will be forced to the nozzle initially as a sudden burst of pressure, this being the operation that would be accomplished by the unrelieved area 61, Figs. 11 and 12.

Fig. 10 shows the beginning of spill at full fuel setting through the ports 20 at the spill recess S of the plunger. In the full fuel position of the plunger, spill also begins to occur at the same point in the stroke through the delivery helix cavity D by reason of the auxiliary spill port 24a intersecting the latter cavity.

Referring to Figs. 11 and 12, illustrating a low idling position of the plunger, these figures (cf. Fig. 5) show diagrammatically at 61 omission of the control relief band 60 for such distance that the pressure control port 55, at low fuel settings only, would be completely closed by the unrelieved land portion 45 above the upper control edge 50 of the helix cavity D thus insuring a desirably high initial injection pressure. Until the plunger has been lowered sufficiently to open the delivery port 23 at the edge 49 of said cavity and after closing of the supply ports 20 by the lower plunger lands 46 the fuel from the pressure space P is free to return to the supply chamber through the auxiliary spill port 24 shown as being closed in Fig. 11. Thereafter, during further descent of the plunger and before opening of the delivery port 23, the fuel in the pressure space would be completely trapped and the pump operating mechanism subjected to strain. The duration of such fuel compression and strain on the operating parts should be very short and probably of less duration than indicated by Fig. 11. If in practice the duration of fuel compression and strain prior to injection necessary to cause the desired initial injection pressure becomes so short as to make manufacturing difficult, then a control band area completely encircling the plunger as indicated by full lines in Fig. 11 provides a shallow relief area operating in conjunction with the relief port 55 to produce the control of initial injection pressure.

Referring to Figs. 13 and 15 inclusive, these show the relationship of plunger cavities and cylinder ports at an initial no fuel position of the plunger and during different portions of the pressure stroke. Fig. 13 shows the main supply and spill ports 20 closed, but with the auxiliary port 24a still open to the spill cavity extension S'. Fig. 14 shows all the spill openings closed except the pressure control port 55 which for the short interval between closing of the auxiliary spill port 24a and opening of the main spill and supply ports 20 to the cavity S functions to prevent generation of excessive pressures in the pump. Fig. 15 shows the plunger at the bottom of the stroke.

Fig. 16 shows the relationship between the plunger and cylinder cavities and ports in a maximum shut-off position beyond that necessary to cause cessation of injection.

I claim:

1. A fuel injector pump of the type having a pump cylinder and a plunger slidable therein, said plunger and cylinder cooperating to form a pressure chamber and being relatively rotatable for adjusting the maximum volume of fuel that may be delivered per pressure stroke of the pump, said plunger having valving cavity means presenting a control helix edge cooperating with port means in the cylinder to begin and terminate each injection operation, a relief port in the cylinder and a broad passage of minute radial depth relative to the radial depth of the cavity means formed between the cylinder bore and the plunger and communicating the pressure space with the relief port during at least part of the pressure stroke, said passage and port cooperating to control the injection pressure in the pump during such part of the pressure stroke.

2. A fuel injector pump of the type having a pump cylinder and a plunger slidable therein, said plunger and cylinder cooperating to form a pressure chamber and being relatively rotatable for adjusting the maximum volume of fuel that may be delivered per pressure stroke of the pump, said plunger having valving cavity means presenting a delivery control helix edge arranged to open a delivery port in the cylinder to start each injection operation, a relief port in the cylinder and a broad passage of minute radial depth relative to the radial depth of the cavity means formed between the cylinder bore and the plunger and communicating the pressure space with the relief port during at least part of the pressure stroke, said passage and port cooperating to build up and maintain injection pressure in the pump during such part of the pressure stroke.

3. A fuel injector pump wherein a constant stroke valving and pumping plunger and a ported cylinder cooperate to form a pressure chamber between them which is rendered variably effective for fuel delivery adjustment depending upon the relatively turned position of the plunger and cylinder, a pressure control means for the chamber comprising a vent port communicating with the cylinder bore and a relief area of greater radial depth than ordinary working clearance but on that order formed between the plunger and cylinder and intersecting a valving edge of the plunger so as restrictedly to communicate the vent port with the pressure chamber during at least part of the pressure stroke of the plunger.

4. A fuel injector pump comprising a pump plunger with fuel adjustment cavity means, said plunger being slidable in a cylinder and providing with the plunger a pressure chamber continuously communicating with said cavity means, a delivery port in the cylinder opened by an edge which defines part of the cavity means to commence injection at different points in the plunger stroke depending upon the turned fuel-adjusting position of the plunger, a pressure control relief area on the plunger of a radial depth on the order of ordinary working clearance but greater, said area intersecting a port closing edge of the plunger and extending along such hedge circumferentially of the plunger, and cooperating vent port means intersecting the cylinder bore surface and positioned to communicate with the relief area in a plurality of fuel adjusting positions of the plunger and during at least part of the pressure stroke of the plunger.

5. A fuel injector of the type wherein a cylinder and a plunger slidably fitting the same and forming a fuel pump are relatively reciprocated to valve and force fuel under pressure to a nozzle and relatively rotated to adjust the effective capacity of the pump; characterized by provision of a delivery port in the cylinder which port is opened by valving cavity means of the plunger during each pressure stroke to start injection, a by-pass port in the cylinder, and a radially extremely shallow relief passage as compared to the radial depth of the cavity means extending circumferentially between the plunger and the cylinder in constant communication with a portion of the cavity means and extending axially of the plunger so as to afford a restricted fuel duct between a portion of the cavity means and the by-pass port during at least part of such pressure stroke.

6. A fuel injector pump of the type wherein a cylinder and a plunger, slidably fitting the same and cooperating to form a pressure chamber are relatively reciprocated to valve and force fuel under pressure to a nozzle, and relatively rotated to adjust the maximum volume displaced per pressure stroke; characterized by provision of a pressure regulator by-pass port in the cylinder and yieldable means normally closing the port, and a restricted passage comprising a very slightly reduced diameter portion of the plunger, said passage being in constant communication with the pressure chamber and extending along the plunger for communication with the by-pass port during at least part of each pressure stroke of the pump.

7. A fuel injector pump of the type wherein a cylinder and a plunger, slidably fitting the same and cooperating to form a pressure chamber are relatively reciprocated to valve and force fuel under pressure to a nozzle, and relatively rotated to adjust the maximum volume displaced per pressure stroke; characterized by provision of a delivery port in the cylinder positioned to be opened by a valving cavity means in the plunger on each pressure stroke to start injection, a pressure regulator by-pass port in the cylinder and yieldable means normally closing the port, and a restricted passage comprising a very slightly reduced diameter portion of the plunger, said passage being in constant communication with the pressure chamber and extending along the plunger for communication with the by-pass port during at least part of each pressure stroke of the pump.

8. A fuel injector pump comprising a plunger having a delivery helix cavity and a cylinder fitting the plunger and providing a pressure chamber at one end thereof, the plunger being rotatable for fuel adjustment, said cylinder having a delivery port transverse to the cylinder axis and registering with the helix cavity during a pressure stroke of the plunger to start injection, a transverse bore in the cylinder wall opposite the delivery port and aligned therewith, a generally horizontal spill cavity in the plunger axially spaced from the delivery cavity, said cavities constantly communicating with each other and with the pressure chamber, a supply and spill port in the cylinder closed by the plunger during a pressure stroke thereof to trap fuel in the pressure chamber and opened by the spill cavity to terminate injection near the end of said plunger stroke, the spill cavity having a portion extended along the plunger toward the delivery cavity, said transverse bore communicating with the extended portion of the spill cavity during no-fuel and low-fuel adjustments of the plunger.

9. A fuel injector pump comprising a cylinder closed at one end to provide a pressure chamber and having a common supply and spill port and a delivery port in its wall, both transverse to the axis of the cylinder, a pump plunger slidably fitting the cylinder, said plunger being rotationally adjustable for fuel setting and having radially open intercommunicating cavity portions providing a delivery-port-controlling edge and a separate spill-controlling edge, said cavity portions also communicating with the pressure chamber, relatively restricted pressure control means communicating with the pressure chamber prior to and during the time the delivery port is opened, said pressure control means being rendered operative by the plunger during its pressure stroke, and a supplemental spill port in the cylinder opposite the delivery port and positioned to be opened by one of said cavity portions in a manner to delay the beginning of operation of the pressure control means during the pressure stroke of the plunger and after closing of the first mentioned port.

10. In a fuel injector mechanism for internal combustion engines, a pump cylinder and plunger arranged for relative reciprocating movement at different speeds and cooperating to provide a pressure chamber, a feed port intersecting the cylinder and opened by a valving edge of the plunger during such relative movement in one direction to initiate fuel flow through the feed port, and pressure controlling restricted vent means for the chamber whose venting area transverse to the direction of flow therethrough is unaffected by variations in pump speed except as pressure at high speeds causes slight deflection of the cylinder or plunger, a portion of said vent means being of varying extent in the direction of flow therethrough during such relative movement of the cylinder and plunger in said one direction.

11. In a fuel injector mechanism for internal combustion engines, a pump cylinder and plunger arranged for relative reciprocating movement at different speeds and cooperating to provide a pressure chamber, a feed port intersecting the cylinder and opened by a valving edge of the plunger during such relative movement in one direction to initiate fuel flow through the feed port, and pressure controlling vent means for the chamber whose venting area transverse to the direction of flow therethrough is unaffected by variations in pump speed except as pressure at high speeds causes slight deflection of the cylinder or plunger.

12. In a fuel injector mechanism for internal combustion engines, a pump cylinder and plunger arranged for relative reciprocating movement at different speeds and cooperating to provide a pressure chamber, a feed port intersecting the cylinder and opened by a valving edge of the plunger during such relative movement in one direction to initiate fuel flow to an atomizing nozzle orifice means connected to the feed port, and pressure controlling vent means for the chamber whose venting area transverse to the direction of flow therethrough is unaffected by variations in pump speed except as pressure at high speeds causes slight deflection of the cylinder or plunger, said vent means providing an effective restriction to flow of fuel therethrough which increases during the pressure stroke of the pump at all pump speeds.

13. A fuel injector pump wherein a valving and pumping plunger and ported cylinder cooperate to form a pressure chamber between them which is rendered variably effective for fuel delivery adjustment from low toward high fuel settings depending upon the relatively turned position of the plunger and cylinder, a pressure control vent means connected with the pressure chamber, the operative extent of which in the direction of fuel flow increases according to the fuel delivery adjustment from low toward high fuel settings.

14. In a fuel injector mechanism for internal combustion engines, a ported pump cylinder and valving plunger arranged for relative reciprocating movement and providing an injection pressure chamber, primary and secondary pressure control restricted vent means operatively associated with the chamber and rendered operative by and during said relative movement in the fuel injecting direction so that the primary vent means alone establishes an initial chamber pressure and subsequently the two means act in series to establish a higher injection pressure.

GARDINER M. ROGERS.

REFERENCES CITED

The following references are of record in the file of this patent:

UNITED STATES PATENTS

| Number | Name | Date |
| --- | --- | --- |
| 1,854,009 | Wilkinson | Apr. 12, 1932 |
| 1,966,694 | Vaudet et al. | July 17, 1934 |
| 2,096,711 | Fielden | Oct. 26, 1937 |
| 2,144,861 | Truxell | Jan. 24, 1939 |
| 2,223,755 | Dillstrom | Dec. 3, 1940 |
| 2,258,055 | Holloway et al. | Oct. 7, 1941 |
| 2,272,094 | Murphy | Feb. 3, 1942 |
| 2,420,164 | Bremser | May 6, 1947 |